US008929679B1

(12) United States Patent
Faaborg et al.

(10) Patent No.: US 8,929,679 B1

(45) Date of Patent: Jan. 6, 2015

(54) SYSTEMS AND METHODS FOR CHANGING CONTRAST BASED ON BRIGHTNESS OF AN OUTPUT FOR PRESENTATION ON A DISPLAY

(71) Applicant: Google Inc., Mountain View, CA (US)

(72) Inventors: Alexander Faaborg, Mountain View, CA (US); Peter Ng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/916,414

(22) Filed: Jun. 12, 2013

(51) Int. Cl.
*G06K 9/40* (2006.01)
*G09G 5/30* (2006.01)
*G09G 5/02* (2006.01)

(52) U.S. Cl.
CPC ... *G09G 5/30* (2013.01); *G09G 5/02* (2013.01)
USPC ........................................................ 382/274

(58) Field of Classification Search
USPC .......................... 382/162, 274, 276; 345/589
See application file for complete search history.

(56) References Cited

U.S. PATENT DOCUMENTS 7,411,583 B1 * 8/2008 Wong et al. .................. 382/276

* cited by examiner

*Primary Examiner* — Duy M Dang
(74) *Attorney, Agent, or Firm* — Troutman Sanders LLP; James E. Schutz; Christopher W. Glass

(57) ABSTRACT

Certain implementations of the disclosed technology may include systems and methods for changing a contrast level associated with an output for presentation on a display in response to detecting a change in a brightness level. According to an example implementation, a method is provided. The method includes determining, by a computing device, a first brightness level associated with an output for presentation on a display. The method also includes determining, by the computing device, a first contrast level associated with the output for presentation on the display. Responsive to detecting, by the computing device, a change from the first brightness level to a second brightness level, the method includes changing, by the computing device, the first contrast level to a second contrast level.

18 Claims, 4 Drawing Sheets

SYSTEMS AND METHODS FOR CHANGING CONTRAST BASED ON BRIGHTNESS OF AN OUTPUT FOR PRESENTATION ON A DISPLAY

BACKGROUND

In optics, "brightness" may refer to the level of light a source appears to emit. "Contrast" may refer to the difference in luminance or chrominance that makes an object, or its representation in an image or display, visually distinguishable. In the context of computing devices, a change in a level of brightness associated with output for presentation on a display may correlate with a change in the level of ambient light in the surrounding environment, for example an increase in the level of light in a room or an increase in an amount of natural light in an outside environment. The change in brightness level may also correspond to a change in a power setting associated with power usage of the computing device, for example a user-initiated adjustment to a low power setting in order to conserve battery life. In low brightness conditions, items presented to a user on a display may be difficult to visually distinguish. For example, displayed text may be difficult to read. This can be due to insufficient contrast between the text color and background color.

SUMMARY

Some or all of the above needs may be addressed by certain implementations of the disclosed technology. Certain implementations may include methods, systems, and non-transitory computer-readable medium for changing a contrast level of output for presentation on a display in response to detecting a change in brightness level.

According to an example implementation, a method is provided. The method includes determining, by a computing device, a first brightness level associated with an output for presentation on a display including at least one background element with a corresponding background color and at least one text element with a corresponding text color The method also includes determining, by the computing device, a first contrast level associated with the output for presentation on the display. Responsive to detecting, by the computing device, a change from the first brightness level to a second brightness level, the method includes changing, by the computing device, the first contrast level to a second contrast level. Changing, by the computing device, the first contrast level to the second contrast level includes at least one of: changing, by the computing device, the background color of the at least one background element from a first background color to a second background color; and changing, by the computing device, the text color of the at least one text element from a first text color to a second text color.

In another example implementation, a system is provided. The system includes a display, one or more processors in communication with the display, and at least one memory in communication with the one or more processors and configured for storing data and instructions. The instructions, when executed by the one or more processors, cause the system to: determine a first brightness level associated with an output for presentation on the display including at least one background element with a corresponding background color and at least one text element with a corresponding text color; determine a first color contrast level associated with the output for presentation on the display; and in response to detecting a change from the first brightness level to a second brightness level, change the first contrast level to a second contrast level.

According to another example implementation, a non-transitory computer-readable medium is provided that stores instructions that, when executed by at least one processor in a system, cause the system to perform a method. The method includes determining, by a computing device, a first brightness level associated with an output for presentation on a display including at least one background element with a corresponding background color and at least one text element with a corresponding text color. The method also includes determining, by the computing device, a first contrast level associated with the output for presentation on the display. Responsive to detecting, by the computing device, a change from the first brightness level to a second brightness level, the method includes changing, by the computing device, the first contrast level to a second contrast level. Changing, by the computing device, the first contrast level to the second contrast level includes at least one of: changing, by the computing device, the background color of the at least one background element from a first background color to a second background color; and changing, by the computing device, the text color of the at least one text element from a first text color to a second text color.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
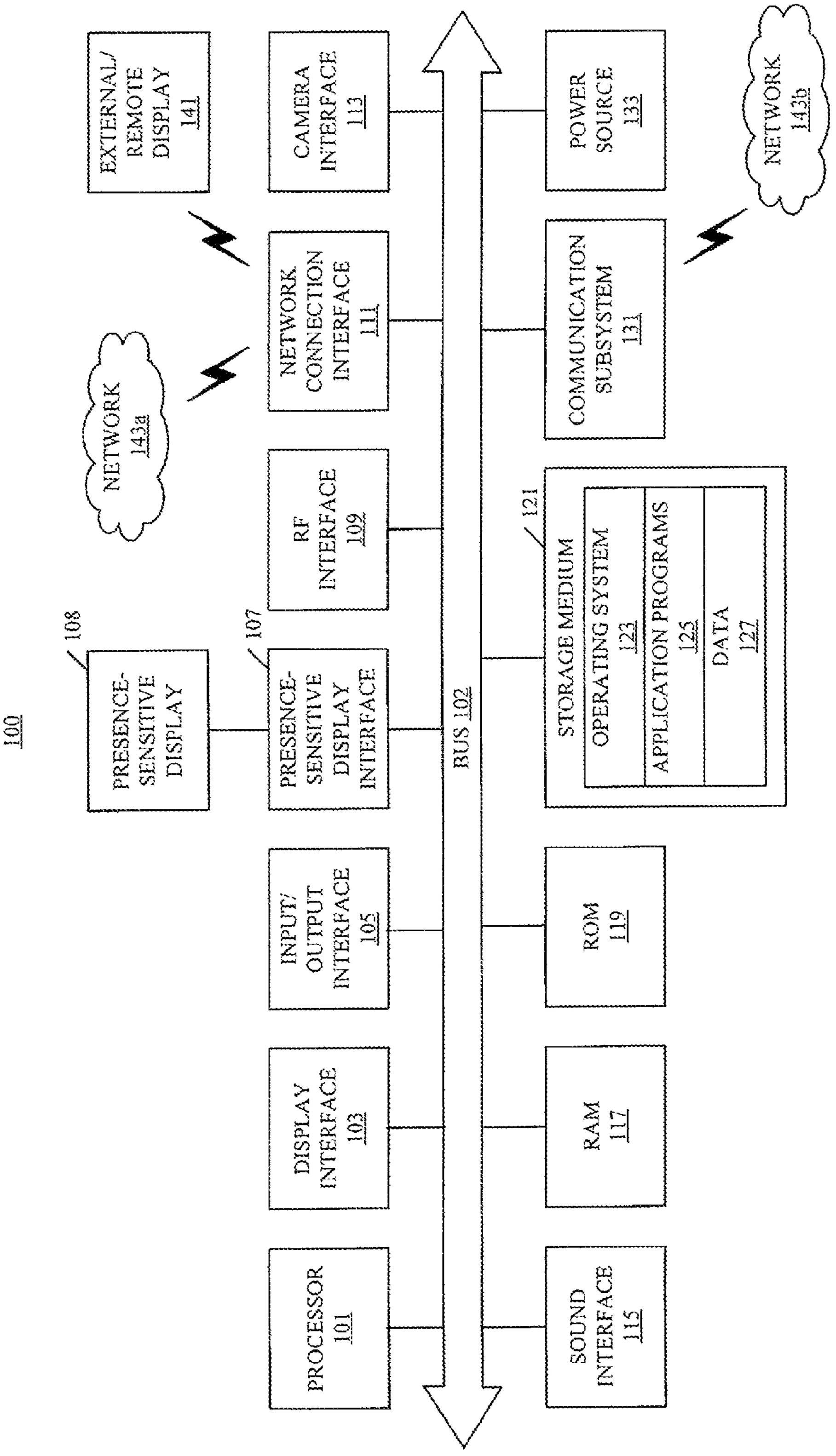
FIG. 1 is a block diagram of a computing device architecture 100 according to an example implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain implementations of the disclosed technology may enable increased clarity for visual aspects of elements presented on a display screen of a computing device. For example, certain implementations of the disclosed technology may enable increased readability of visual user interface elements (e.g., text elements or icons) output on display screens of or operatively coupled to a computing device. According to example implementations disclosed herein, when a change in brightness level associated with an output for presentation on a display is detected, a contrast level is changed in response.

The visual qualities of each specific color in the visible color spectrum are a result of relative values of its component parts. In terms of visual perception, each color can be defined by three components: luminance, hue, and saturation, where hue and saturation collectively form "chrominance." Images formed on an electronic display screen are commonly composed of RGB component values, where each pixel has a specific value of red (R), green (G), and blue (B), respectively. In the RGB color model, all visible colors can be constructed from a combination of red, green, and blue components. The RGB values for each of the red, green, and blue components range from 0 to 255, where (0, 0, 0) corresponds to black and (255, 255, 255) corresponds to white.

To change a lighter color to a darker color, generally one or more of the RGB values are decreased towards the values of the color black (0,0,0), and to change a darker color to a lighter color, generally one or more of the RGB values are increased towards the values of the color white (255, 255, 255). For example, a change from light green (144, 238, 144) to midnight blue (25, 25, 112) corresponds to color value adjustments of −119 for the red component, −213 for the green component, and −32 for the blue component.

According to the RGB color system, changing a level of contrast may refer to changing a level of color contrast. When applied to elements that are output for presentation on a display, for example a colored background and colored text shown over the background, color contrast may refer to the perceived lightness-darkness of one color relative to another. For example, dark grey text displayed over a light yellow background produces a greater level of color contrast than green text over a light yellow background. RGB is one of many color systems that can be used for implementations of the disclosed technology. It will be appreciated that the disclosed technology can be applied regardless of the particular color system used.

Various aspects of the technology disclosed herein may be utilized for changing a contrast level associated with an output for presentation on a display of a computing device, in response to detecting a change in a brightness level associated with the output for presentation on the display. Example implementations of the disclosed technology will now be described with reference to the accompanying figures.

Figure 2A:
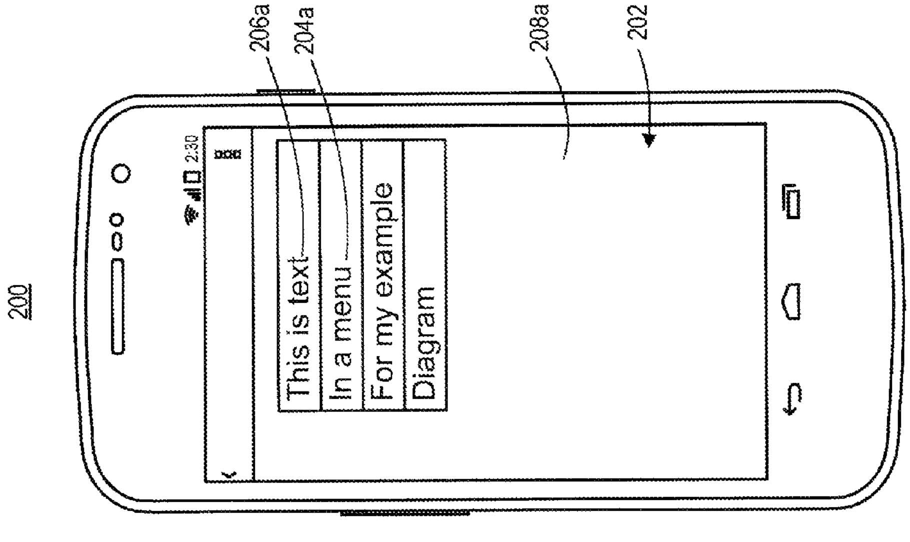
FIG. 2A is an illustration of a computing device 200, displaying background elements of a first background color and text elements of a first text color, according to an example implementation.
Figure 2B:
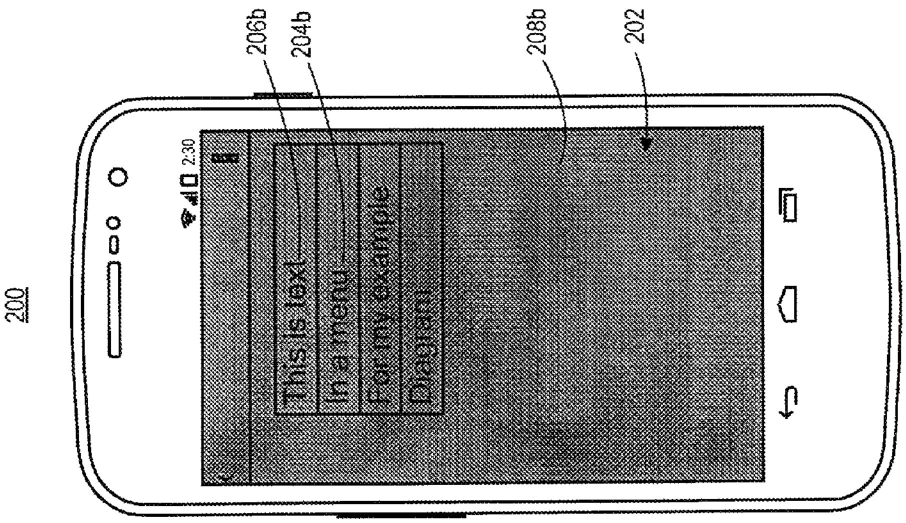
FIG. 2B is an illustration of a computing device 200, displaying background elements of a second background color and text elements of a second text color, according to an example implementation.

FIG. 1 is a block diagram illustrating an example implementation of a computing device 100 in accordance with various aspects set forth herein. Certain aspects of the computing device 100 may be embodied in a mobile device (for example, the computing device 200 as shown in FIGS. 2A and 2B). In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive display, a scroll wheel, a digital camera, a digital video camera, a web camera, a microphone, a sensor, a smartcard, and the like. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143*a*. The network 143*a* may encompass wired and wireless communication networks such as a local-area network (LAN), a wide-area network (WAN), a computer network, a wireless network, a telecommunications network, another like network or any combination thereof. For example, the network 143*a* may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143*b* using the communication subsystem 131. The network 143*a* and the network 143*b* may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143*b* may encompass wired and wireless communication networks such as a local-area network (LAN), a wide-area network (WAN), a computer network, a wireless network, a telecommunications network, another like network or any combination thereof. For example, the network 143*b* may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

FIG. 2A illustrates an example implementation of a computing device 200, with background elements 204*a* and 208*a* of a first background color and text elements 206*a* of a first text color, output for presentation on a display 202. The background elements 204*a*, 208*a* and text elements 206*a* are output for presentation on the display 202 at a first brightness level. As shown, the first background color corresponds to RGB values of (224, 224, 224), and the first text color corresponds to RGB values of (160, 160, 160). The background elements 204*a*, 208*a* correspond to a menu with a list of items for selection by a user of the computing device 200, presented over a blank region, respectively. The display 202 may be configured as a presence-sensitive display that includes, for example, a touch screen for receiving gestures from a user. The computing device 200 may be configured to, in response to receiving one or more gestures, perform various functions associated with, for example, functions associated with operation of a mobile device application.

A camera 208 may be configured for capturing digital images or video. The computing device 200 may include a camera interface (such as the camera interface 114 shown in FIG. 1), which may be configured to control the image capturing functions associated with the camera 208. The camera 208 may include one or more light sensors that may be configured to determine a brightness level or ambient light level associated with the output for presentation on the display 202. In FIG. 2A, the computing device 200 is configured to generate full brightness on the display 202, which for purposes of this example implementation will be referred to as a first brightness level. This may correspond to a high power output setting for light emitting elements that provide illumination associated with the output for presentation on the display 202, for example light emitting diodes (LEDs) that provide backlighting for the presentation on the display 202, or red, green, and blue colored LEDs that provide the specific colors associated with each pixel of the display 202.

The brightness level associated with the output for presentation on the display 202 may be proportional to an amount of power supplied to light emitting elements, for example by a power source such as the power source 130 shown in FIG. 1, which may be a portable power source such as a rechargeable battery. The computing device 200 may allow for multiple power settings, such as a high power setting and various other lower power settings, where lower power settings may correspond to a low brightness level and higher power settings may correspond to a higher brightness level. Accordingly, the brightness level may be determined by detecting a specific power setting of the power source.

The computing device 200 may be configured to detect a change in brightness level, for example a decrease in brightness level from the first brightness level to a lower, second brightness level. The decrease may correlate with a change in the level of ambient light in the surrounding environment, for example an increase in the level of light in a room or increase in amount of natural light in an outside environment. The decrease may also correlate with a decrease in the power setting, for example a user-initiated change from a higher power setting to a lower power setting in order to conserve battery life of the computing device 200.

The computing device 200 may be configured to, in response to detecting the decrease in brightness level from the first brightness level to the lower, second brightness level, change the level of contrast between the background elements and text elements. The color values such as the RGB values associated with the color of the background elements may be changed relative to the color values associated with the color of the text elements, in order to increase the level of contrast. This increase in contrast may be accomplished by changing the RGB values of the background color to be lighter and/or changing the RGB values of the text color to be darker. For example the output for presentation on the display 202 in FIG. 2B has a lower brightness level as compared to the output for presentation on the display 202 in FIG. A. The RGB values for the text color may be changed from the first text color (160, 160, 160) to a second, darker text color (64, 64, 64) shown in FIG. 2B. That is, the text color has been darkened in response to detecting a decrease in brightness level. As illustrated in FIG. 2B, the background elements 204*b*, 208*b* have the second, lighter background color and the text elements 206*b* have the darker, second text color.

It will be appreciated that variations in the particular colors, brightness levels, contrast levels, and light levels may be utilized without departing from the scope of the technology disclosed herein. For example, the computing device 200 may detect a change in brightness level, associated with the output for presentation on the display 202, from a first brightness level to a second brightness level that is higher than the first brightness level and, accordingly, the color contrast level may be decreased in response, by changing the first background color to a darker, second background color and/or changing the first text color to a lighter, second text color. For example, the background color may be changed to light green (144, 238, 144) and the text color may be changed to midnight blue (25, 25, 112). It will be appreciated that a background may include numerous colors and one or more of the colors may be adjusted.

Figure 3:
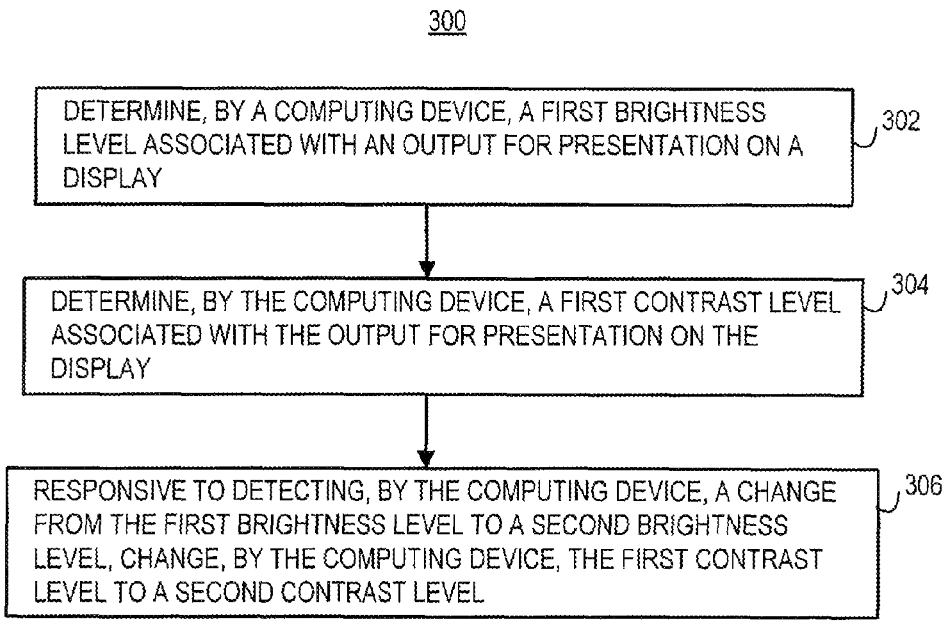
FIG. 3 is a flow diagram 300 of a method according to an example implementation.

FIG. 3 is a flow diagram 300 of a method according to an example implementation. The method starts in block 302, and according to an example implementation includes determining, by a computing device, a first brightness level associated with an output for presentation on a display. In block 304, the method includes determining, by the computing device, a first contrast level associated with the output for presentation on the display. In block 306, the method includes, responsive to detecting, by the computing device, a change from the first brightness level to a second brightness level, changing, by the computing device, the first contrast level to a second contrast level. The method ends following block 306.

Detecting, by the computing device, the change from the first brightness level to the second brightness level may include detecting, by the computing device, a change in screen brightness and/or ambient light conditions associated with the output for presentation on the display. Detecting, by the computing device, the change from the first brightness level to the second brightness level may also include detecting, by the computing device, a change in power usage of the computing device. The output for presentation on the display may include at least one background element with a corresponding background color and at least one text element with a corresponding text color.

Changing, by the computing device, the first contrast level to the second contrast level may include changing, by the computing device, the background color of the at least one background element from a first background color to a second background color and/or changing, by the computing device, the text color of the at least one text element from a first text color to a second text color. Changing, by the computing device, the background color of the at least one background element may include changing, by the computing device, at least one color component value associated with the background color of the at least one background element. Changing, by the computing device, the text color of the at least one text element may include changing, by the computing device, at least one color component value associated with the text color of the at least one text element.

Changing, by the computing device, the background color of the at least one background element and/or the text color of the at least one text element may include, responsive to detecting, by the computing device, that the second brightness level is lower than the first brightness level, increasing, by the computing device, a color contrast level between the background color of the at least one background element and the text color of the at least one text element. Where the second background color is lighter than the first background color, increasing, by the computing device, the color contrast level between the background color of the at least one background element and the text color of the at least one text element may include changing, by the computing device, the darker, first background color to the lighter, second background color. Where the second text color is darker than the first text color, increasing the color contrast level between the background color of the at least one background element and the text color of the at least one text element may include changing, by the computing device, the lighter, first text color to the darker, second text color.

Figure 4:
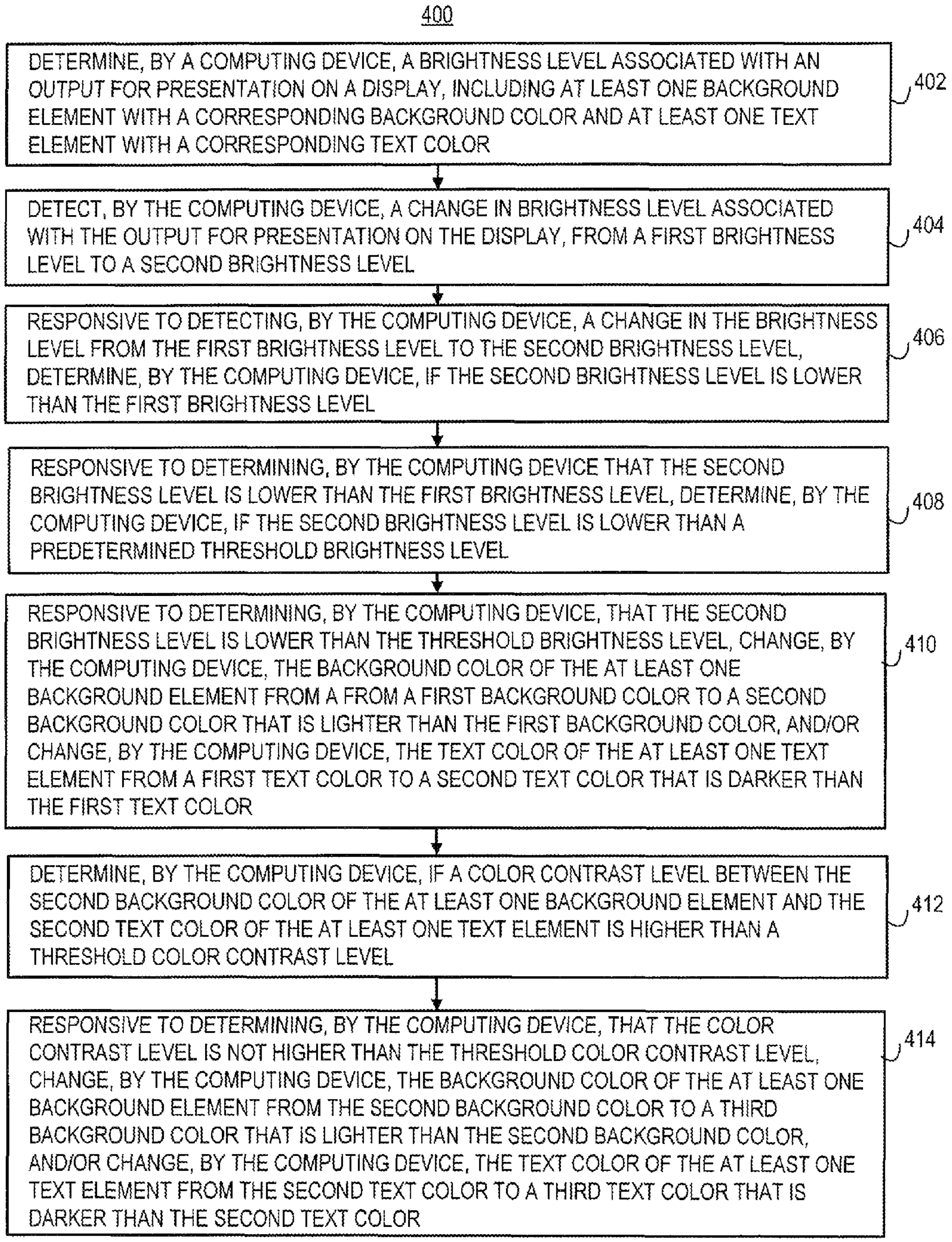
FIG. 4 is a flow diagram 400 of a method according to another example implementation.

FIG. 4 is a flow diagram 400 of a method according to another example implementation. The method starts in block 402, and according to an example implementation includes determining, by a computing device, an brightness level associated with an output for presentation on a display, including at least one background element with a corresponding background color and at least one text element with a corresponding text color. In block 404, the method includes detecting, by the computing device, a change in brightness level associated with the output for presentation on the display, from a first brightness level to a second brightness level. In block 406, the method includes, responsive to detecting, by the computing device, a change in the brightness level from the first brightness level to the second brightness level, determining, by the computing device, if the second brightness level is lower than the first brightness level.

In block 408, the method includes, responsive to determining, by the computing device, that the second brightness level is lower than the first brightness level, determining, by the computing device, if the second brightness level is lower than a predetermined threshold brightness level. In the block 410, the method includes, responsive to determining, by the computing device, that the second brightness level is lower than the threshold brightness level, changing, by the computing device, the background color of the at least one background element from a first background color to a second background color that is lighter than the first background color, and/or changing, by the computing device, the text color of the at least one text element from a first text color to a second text color that is darker than the first text color. In block 412, the method includes determining, by the computing device, if a color contrast level between the second background color of the at least one background element and the second text color of the at least one text element is higher than a threshold color contrast level.

In block 414, the method includes, responsive to determining, by the computing device, that the color contrast level is not higher than the threshold color contrast level, changing, by the computing device, the background color of the at least one background element from the second background color to a third background color that is lighter than the second background color, and/or changing, by the computing device, the text color of the at least one text element from the second text color to a third text color that is darker than the second text color. The method ends following block 414.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

determining, by a computing device, a first brightness level associated with an output for presentation on a display including at least one background element with a corresponding background color and at least one text element with a corresponding text color;

determining, by the computing device, a first contrast level associated with the output for presentation on the display; and responsive to detecting, by the computing device, a change from the first brightness level to a second brightness level, changing, by the computing device, the first contrast level to a second contrast level, wherein changing, by the computing device, the first contrast level to the second contrast level includes at least one of:

changing, by the computing device, the background color of the at least one background element from a first background color to a second background color; and changing, by the computing device, the text color of the at least one text element from a first text color to a second text color.

2. The method of claim 1, wherein detecting, by the computing device, a change from the first brightness level to the second brightness level comprises detecting, by the computing device, a change in screen brightness associated with the output for presentation on the display.

3. The method of claim 1, wherein detecting, by the computing device, a change from the first brightness level to the second brightness level comprises detecting, by the computing device, a change in ambient light conditions associated with the output for presentation on the display.

4. The method of claim 1, wherein detecting, by the computing device, a change from the first brightness level to the second brightness level comprises detecting, by the computing device, a change in power usage of the computing device.

5. The method of claim 1, wherein changing, by the computing device, the background color of the at least one background element comprises changing, by the computing device, at least one color component value associated with the background color of the at least one background element.

6. The method of claim 1, wherein changing, by the computing device, the text color of the at least one text element comprises changing, by the computing device, at least one color component value associated with the text color of the at least one text element.

7. The method of claim 1, wherein changing, by the computing device, at least one of the background color of the at least one background element and the text color of the at least one text element comprises, responsive to detecting, by the computing device, that the second brightness level is lower than the first brightness level, increasing, by the computing device, a color contrast level between the background color of the at least one background element and the text color of the at least one text element.

8. The method of claim 7, wherein the second background color is lighter than the first background color and increasing, by the computing device, the color contrast level between the background color of the at least one background element and the text color of the at least one text element comprises changing, by the computing device, the darker, first background color to the lighter, second background color.

9. The method of claim 7, wherein the second text color is darker than the first text color and increasing, by the computing device, the color contrast level between the background color of the at least one background element and the text color of the at least one text element comprises changing, by the computing device, the lighter, first text color to the darker, second text color.

10. A system comprising:

one or more processors in communication with a display; and at least one memory in communication with the one or more processors and configured for storing data and instructions that, when executed by the one or more processors, cause the system to:

determine a first brightness level associated with an output for presentation on the display including at least one background element with a corresponding background color and at least one text element with a corresponding text color;

determine a first contrast level associated with the output for presentation on the display; and responsive to detecting a change from the first brightness level to a second brightness level, change the first contrast level to a second contrast level, wherein changing, by the computing device, the first contrast level to the second contrast level comprises at least one of:

changing, by the computing device, the background color of the at least one background element from a first background color to a second background color; and changing, by the computing device, the text color of the at least one text element from a first text color to a second text color.

11. The system of claim 10, further comprising an ambient light sensor communicatively coupled to the one or more processors and configured to detect ambient light conditions associated with the output for presentation on the display.

12. The system of claim 10, wherein detecting, by the computing device, a change from the first brightness level to the second brightness level comprises detecting, by the computing device, a change in power usage of the computing device.

13. The system of claim 10, wherein changing, by the computing device, the background color of the at least one background element comprises changing, by the computing device, at least one color component value associated with the background color of the at least one background element.

14. The system of claim 10, wherein changing, by the computing device, the text color of the at least one text element comprises changing, by the computing device, at least one color component value associated with the text color of the at least one text element.

15. The system of claim 10, wherein changing, by the computing device, at least one of the background color of the at least one background color element and the text color of the at least one text element comprises, responsive to detecting, by the computing device, that the second brightness level is lower than the first brightness level, increasing, by the computing device, a color contrast level between the background color of the at least one background element and the text color of the at least one text element.

16. The system of claim 15, wherein the second background color is lighter than the first background color and increasing, by the computing device, the color contrast level between the background color of the at least one background element and the text color of the at least one text element comprises changing, by the computing device, the darker, first background color to the lighter, second background color.

17. The system of claim 15, wherein the second text color is darker than the first text color and increasing, by the computing device, the color contrast level between the background color of the at least one background element and the text color of the at least one text element comprises changing, by the computing device, the lighter, first text color to the darker, second text color.

18. A non-transitory computer-readable medium that stores instructions that, when executed by at least one processor in a system, cause the system to perform a method comprising:

determining, by a computing device, a first brightness level associated with an output for presentation on a display including at least one background element with a corresponding background color and at least one text element with a corresponding text color;

determining, by the computing device, a first contrast level associated with the output for presentation on the display; and responsive to detecting, by the computing device, a change from the first brightness level to a second brightness level, changing, by the computing device, the first contrast level to a second contrast level, wherein changing, by the computing device, the first contrast level to the second contrast level includes at least one of:

changing, by the computing device, the background color of the at least one background element from a first background color to a second background color; and changing, by the computing device, the text color of the at least one text element from a first text color to a second text color.

* * * * *